United States Patent
Wagoner et al.

(10) Patent No.: US 7,994,750 B2
(45) Date of Patent: Aug. 9, 2011

(54) SYSTEMS AND METHODS FOR CONTROLLING A CONVERTER FOR POWERING A LOAD

(75) Inventors: Robert Gregory Wagoner, Roanoke, VA (US); Allen Ritter, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 770 days.

(21) Appl. No.: 12/111,398

(22) Filed: Apr. 29, 2008

(65) Prior Publication Data

US 2009/0268490 A1 Oct. 29, 2009

(51) Int. Cl.
*H02P 27/04* (2006.01)

(52) U.S. Cl. .......... 318/800; 318/400.29; 318/779; 318/799; 363/41; 363/42; 363/56.01; 363/56.02; 363/56.03; 363/65; 363/71

(58) Field of Classification Search .......... 318/800, 318/400.29, 779, 799; 363/41, 42, 56.01, 363/56.02, 56.03, 65, 71
See application file for complete search history.

(56) References Cited

U.S. PATENT DOCUMENTS

| | | | | | |
|---|---|---|---|---|---|
| 4,502,106 | A | * | 2/1985 | Glennon | 363/56.02 |
| 5,805,437 | A | * | 9/1998 | Gruning | 363/71 |
| 2008/0298096 | A1 | * | 12/2008 | Wagoner | 363/37 |
| 2008/0304302 | A1 | | 12/2008 | Wagoner | |
| 2008/0316778 | A1 | * | 12/2008 | Wagoner | 363/65 |
| 2009/0196764 | A1 | * | 8/2009 | Fogarty et al. | 417/44.1 |

OTHER PUBLICATIONS

U.S. Appl. No. 11/809,122, filed May 31, 2007, Robert G. Wagoner.

* cited by examiner

*Primary Examiner* — Bentsu Ro
*Assistant Examiner* — Erick Glass
(74) *Attorney, Agent, or Firm* — Sutherland Asbill & Brennan LLP (57) ABSTRACT

Embodiments of systems and methods for powering a load are provided. In one embodiment, a method may include providing a power converter comprising electrical circuitry comprising at least a first leg and a second leg, supplying an input power signal to the power converter, supplying at least a first gating control signal to the first leg, supplying at least a second gating control signal to the second leg, and outputting at least one output power signal to the load responsive at least in part to the first and the second gating control signals supplied. According to this example embodiment, the first gating signal and the second gating signal may each comprise a waveform comprising a notch, and the second gating control signal may be phase shifted relative to the first gating control signal.

20 Claims, 9 Drawing Sheets

SYSTEMS AND METHODS FOR CONTROLLING A CONVERTER FOR POWERING A LOAD

TECHNICAL FIELD

The invention relates generally to power converters, and more particularly relates to systems and methods for controlling a converter for powering a load.

BACKGROUND OF THE INVENTION

High speed electric machines or high speed, high power electric motors are used in many different applications. For example, high speed, high power electric motors may be utilized in industrial applications to power pumps, fans, blowers, or compressors. High speed, high power electric motors that operate at variable speed are increasingly required in a range of industrial, mining, and drilling activities. Further, the activities often require a high-degree of reliability. In operations such as crude oil pumping from remote global locations where access to pumping stations is difficult and time consuming, reliability of motor operation is necessary to prevent dangerous, costly, and extended outages.

A high-speed, high power electric motor may receive power from a power source. In many applications, the signal that is output from the power source is passed through a power converter prior to being input into the high-speed, high power electric motor. For example, a direct current power signal may be output from the power source and then passed through a direct current to alternating current ("AC") converter in order to produce an appropriate signal for powering an AC electric motor. Additionally, a power converter may incorporate one or more switches that are selectively actuated in order to produce an appropriate signal for powering an electric motor. These switches may be semiconductor devices such as, for example, thyristors (also referred to as "SCRs," or "silicon controlled rectifiers"), triacs, power transistors, power metal oxide semiconductor field-effect transistors (referred to as "MOSFETs"), insulated gate bipolar transistors (referred to as "IGBTs"), integrated gate commutated thyristors (referred to as "IGCTs"), and MOS-controlled thyristors (referred to as "MCTs").

Simple, sturdy, and reliable power converters are requisites for such high-speed, high power motor operations. Converters including multiple, individual components, such as series or parallel semiconductor switches, may have an increased likelihood that any one individual component switch may randomly fail. Adding elements to the converters, such as snubber circuits for semiconductor switches, further increases the number of components that may fail. Thus, it is desirable to arrange a power converter in a simple configuration and to reduce the component count. However, individual components of the power converters should be operated within satisfactory thermal margins and other functional limitations to avoid failures in the simplified converter configurations.

Additionally, for many applications, a high-speed, high power electric motor with a certain power output is required. As the size of the motor is decreased, the same power output may be achieved by increasing the frequency or speed at which the motor rotates. In many cases, the frequency at which the switches are actuated in the power converter is increased to accommodate the increased rotational speed or rotational velocity of the high-speed, high power electric motor. In other words, a higher frequency signal is applied to the motor from the power converter.

Providing a higher frequency input signal to the high-speed, high power electric motor from the power converter, however, may lead to increased heat and total harmonic distortion in the components of the motor. Additionally, increasing the switching frequency of the power converter may lead to a higher amount of switching loss in the power converter.

Accordingly, there exist a need for improved systems and methods for controlling a converter for powering a load.

There is a further need for systems and methods for controlling a converter for powering a load that reduce switching loss and total harmonic distortion in the load.

BRIEF DESCRIPTION OF THE INVENTION

Embodiments of the invention can address some or all of the needs described above. Embodiments of the invention are directed generally to systems and methods for controlling a converter for powering a load.

According to one example embodiment of the invention, a method for powering a load is provided. The method may include providing a power converter comprising electrical circuitry comprising at least a first leg and a second leg, supplying an input power signal to the power converter, supplying at least a first gating control signal to the first leg, supplying at least a second gating control signal to the second leg, and outputting at least one output power signal to the load responsive at least in part to the first and the second gating control signals supplied. According to this example embodiment, the first gating signal and the second gating signal may each comprise a waveform comprising a notch, and the second gating control signal may be phase shifted relative to the first gating control signal.

According to another example embodiment of the invention a system for providing power to a load is provided. The system may include a voltage source operable to supply a power signal, a power converter comprising electrical circuitry comprising at least a first leg and a second leg, and at least one gating controller operable to supply at least a first gating control signal to the first leg and at least a second gating control signal to the second leg of the power converter. According to this example embodiment, the first gating signal and the second gating signal may each comprise a waveform comprising a notch, and the first gating control signal may be phase shifted relative to the second gating control signal. The converter may be operable to receive the power signal from the voltage source and output at least one output power signal to the load responsive at least in part to the first and the second gating control signals supplied.

According to yet another example embodiment of the invention, a method for powering a load is provided. The method may include providing a three-phase wye-connected H-bridge power converter, wherein each phase of the H-bridge power converter comprises two legs, supplying an input power signal to the H-bridge power converter, supplying a different gating control signal to each leg of each phase of the H-bridge power converter, and outputting at least one output power signal to the load responsive at least in part to the gating control signals supplied. Each gating control signal may comprise a waveform comprising a notch, and each gating control signal may be phase shifted relative to the other respective gating control signal supplied to the other leg of the same phase.

Other embodiments and aspects of the invention will become apparent from the following description taken in conjunction with the following drawings.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF THE INVENTION

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will satisfy applicable legal requirements. Like numbers refer to like elements throughout.

According to example embodiments of the invention, systems and methods for providing improved gating control signals to a converter for powering a load such as, for example, a high speed, high power electric motor (also simply referred to herein as a "motor") are disclosed. In one example, the converter includes at least two legs, as further described herein, and at least two gating control signals are supplied to the converter, one to each leg. As used herein, the terms "gating control signal," "input signal," and "input control signal," and "control signal" may be used interchangeably. The gating control signals have a waveform pattern and each include at least one notch. The width of the notch may be adjusted to improve the power signal supplied from the converter to the load. Further, each gating control signal may be phase shifted relative to the other for further power signal improvements. As a result of adjusting the notch width and the phase shifts of the gating control signals, the converter or converters supply an improved power signal to a load, such as a high speed, high power electric motor. The improved power signal may be produced by one or more converters that are supplied with appropriate control signals. The power signal produced responsive to the gating control signals incorporating at least one notch and being phase shifted reduce the total harmonic distortion during the operation of the motor. Additionally, the improved power signal may further reduce switching loss during operation of the motor.

Example embodiments of the invention can perform or otherwise facilitate certain technical effects including, but not limited to, providing improved signals to a load that may reduce the total harmonic distortion and switching loss in the load, providing power converters that supply an improved output signal to a load that may reduce the total harmonic distortion and switching loss in the load, and/or providing one or more gating control signals to a power converter that control the selective actuation of one more switches in the power converter in order to supply an improved output signal to a load that may reduce the total harmonic distortion and switching loss in the load.

Figure 1:
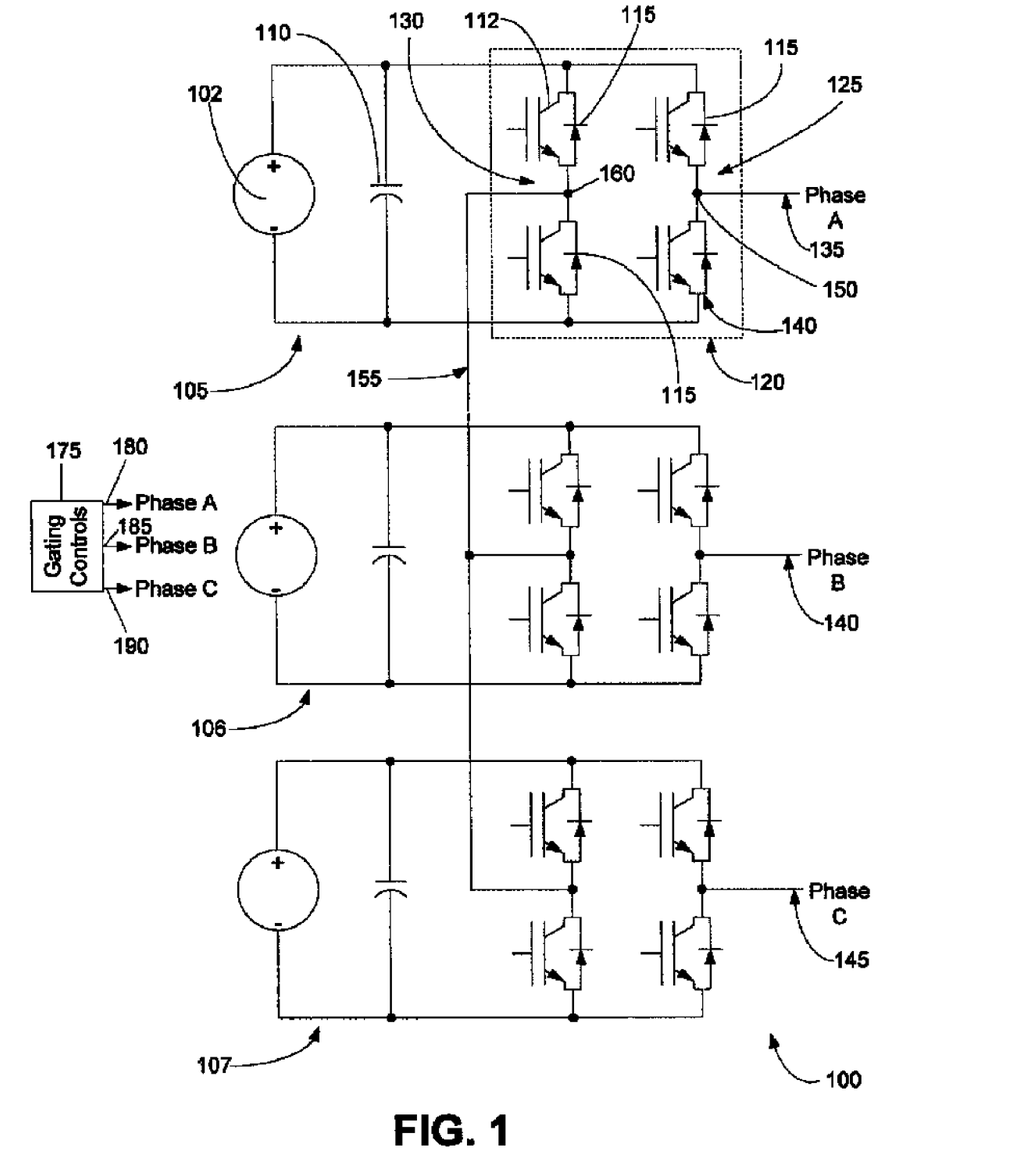
FIG. 1 is a schematic diagram of one example of a power converter that may be utilized according to example embodiments of the invention.

FIG. 1 illustrates an example power converter 100, according to example embodiments of the invention. The power converter illustrated by this example includes a simplified three-phase, wye-connected H-bridge converter configuration is illustrated in FIG. 1. Each phase 105, 106, 107 of the converter includes a power source/sink 102 with a dc power shaping circuit, represented by capacitor 110. The power source/sink 102 and dc power shaping circuit, represented by capacitor 110, establish a dc-link voltage input to the semiconductor switches of the bridge. Insulated-gate bipolar transistors ("IGBTs") 112 with built-in diodes 115 may form each leg of the H-bridges 120, for example, but other power semiconductor switches such as integrated-gate commutated thyristors ("IGCTs") or metal-oxide semiconductor field-effect transistors ("MOSFETs") could be used instead. The type of power semiconductor switch is not important to the analysis. Each H-Bridge includes two legs, an output leg 125 and a neutral leg 130. Each phase output, phase A 135, phase B 140, and phase C 145 is connected to the midpoint 150 of the respective output bridge leg 120. Each neutral connection to wye-point 155 is tied to the midpoint 160 of the respective neutral output leg 125.

Gating controls 175 provide control signals 180, 185, 190 for switching semiconductor switches 112 of each phase 105, 106, 107 of the H-bridge converter, according to predetermined switching patterns. Gating controls may provide for synchronous switching patterns. Gating controls may provide for synchronous switching or asynchronous (for example, pulse-width modulation) switching of the semiconductors switches 112 of the H-bridge.

Figure 2A:
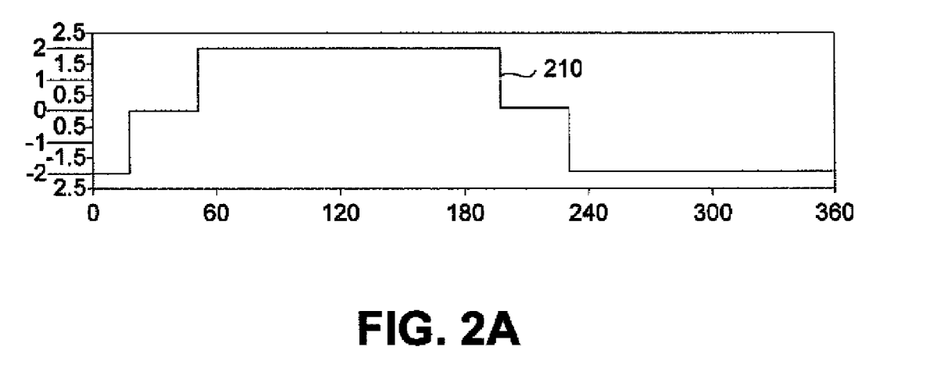
FIGS. 2A and 2B illustrate stepped output voltage of example converters, according to example embodiments of the invention.
Figure 2B:
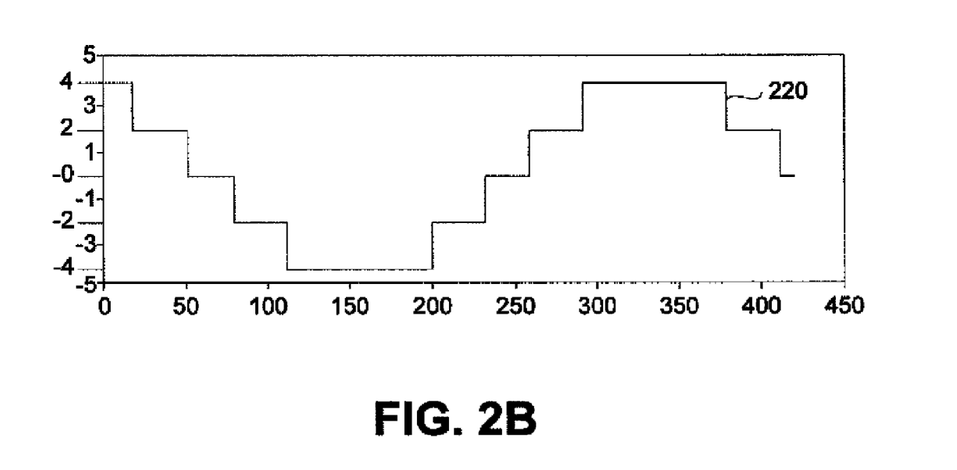

Several fundamental synchronous switching schemes for the three-phase wye-connected H-bridge converter may be considered with respect to the operation of large motors. The switching schemes establish a fundamental voltage output frequency for driving the motor. The switching output 210 of one phase of the H-bridge (between the midpoints of the respective legs) may establish a positive step output, a negative step output and a zero-value output, known as a three-level output as shown in FIG. 2A. However in the three-phase wye-connected configuration, the output line voltage 220 (for example, phase A to phase B) will provide a five-level output due to the combination of steps from the H-bridge of phase A and the H-bridge of phase B, as illustrated in FIG. 2B. Higher number of levels of output voltage will more closely simulate a sinusoidal wave and reduce harmonic distortion to the motor.

It is appreciated that while FIG. 1 illustrates a three-phase, wye-connected H-bridge power converter, other power converters having different configurations may be used in embodiments of the invention. For example, a single phase power converter may be used in other example embodiments. Alternatively, in yet other example embodiments, a deltaconfigured converter may be used. These example power converter configurations are not intended to be limiting examples, but instead are described for illustrative purposes.

Figure 3:
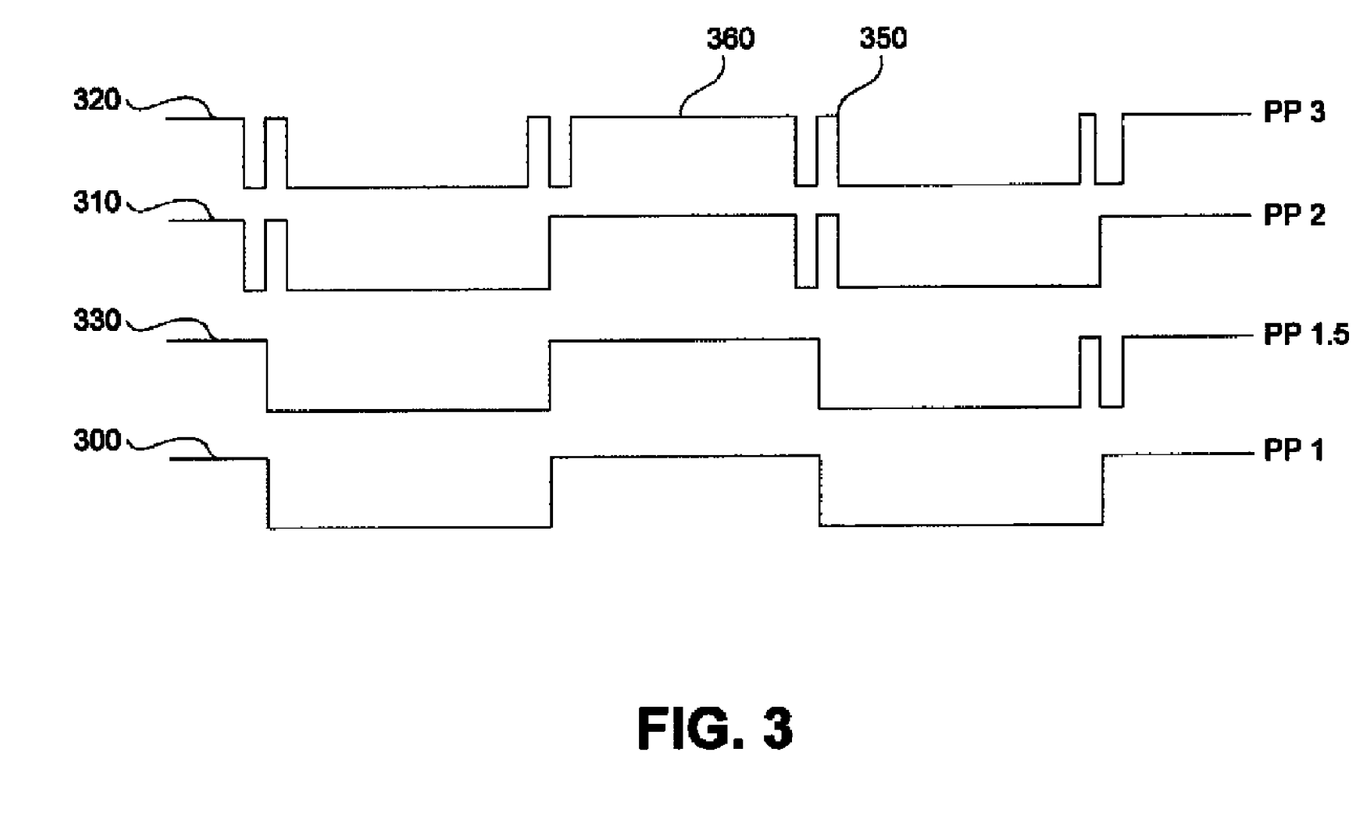
FIG. 3 illustrates example gating control signals according to an example embodiment of the invention.

Four fixed pulse patterns with same fundamental frequency are illustrated in FIG. 3. The fixed pulse patterns applied to the semiconductor switches of the individual H-bridges are 120 electrical degrees apart, resulting in the line output between phases (for example, phase A to phase B) being 120 electrical degrees apart. Notches may be inserted around fundamental frequency pulses 360 of the pulse patterns to improve harmonic distortion performance. Insertion of notches 350 adds to the effective switching frequency of the bridge output. Pulse pattern 1 ("PP1") 300 has an effective switching frequency of 1 times the fundamental frequency. Pulse pattern 2 ("PP2") 310 has an effective switching frequency of 2 times the fundamental frequency. Pulse pattern 3 ("PP3") 320 has an effective switching frequency of 3 times the fundamental frequency. Pulse pattern 1.5 ("PP1.5") 330, with a notch applied in every other cycle, has an effective switching frequency of 1.5 times the fundamental frequency.

The one or more notches 350 may be generated by causing a change in the state of an input signal followed by a return of the input signal to its state prior to the change. For example, if the input signal is currently a high input signal, a notch 350 may be generated by a shift of the input signal to a low input signal and then a shift of the input signal back to a high input signal. As another example, if the input signal is currently a low input signal, a notch 350 may be generated by a shift of the input signal to a high input signal and then a shift of the input signal back to a low input signal.

Each of the one or more notches 350 may be a notch with a relatively short duration (also referred to as a "notch width") respective to the period of the input signal. According to one example, the notch width of the notch 350 may be approximately 20 degrees or less given an approximately 360 degree period of an input signal. In one example, the notch width may be between approximately 5 degrees and approximately 20 degrees. It will be understood that the notch width may be determined at least in part by the specifications, parameters, and/or capabilities of a switch to which the input signal is supplied. In other words, a switch may have a minimum time that is required for actuation, and the notch width may be based at least in part on the minimum time to actuate the switch one and off or off and on. Additionally, the appropriate notch width may be determined through measurement and monitoring component behavior, and may depend at least in part on the power converter circuitry and/or the load characteristics.

Higher switching rates due to the insertion of the notches may incur higher switching losses on the semiconductor switches, putting the semiconductor switch closer to thermal margins and potentially impacting reliability of operation. During experimentation, PP1 illustrated the lowest effective switching frequency and hence incurred the lowest switching loss in the semiconductor switches. However, PP1.5 presented the lowest harmonic distortion and at the same time, less switching loss than PP2 and PP3.

Figure 4A:
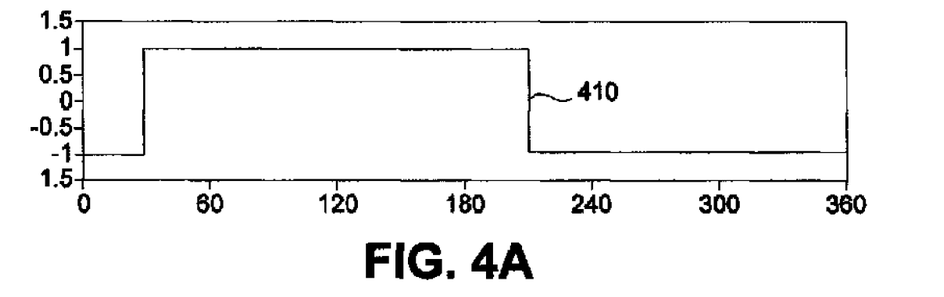
FIGS. 4A-4D illustrate example input waveforms and converter outputs according to example embodiments of the invention.
Figure 4B:
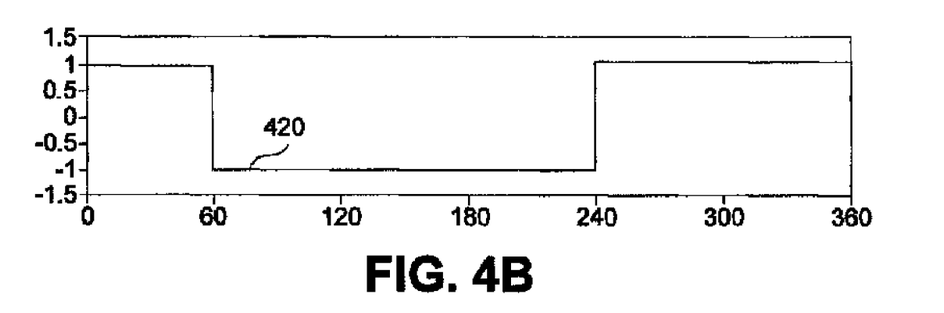
Figure 4C:
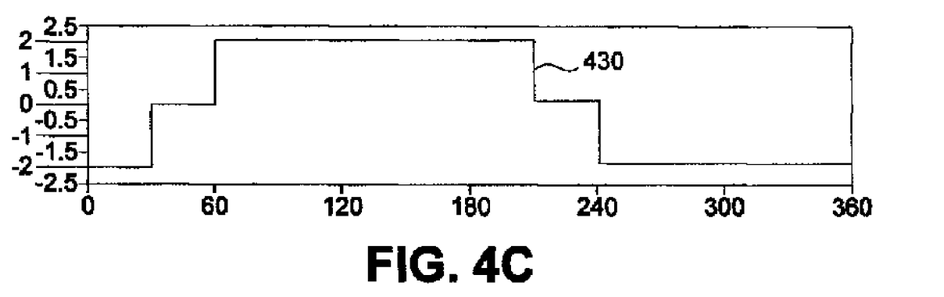
Figure 4D:
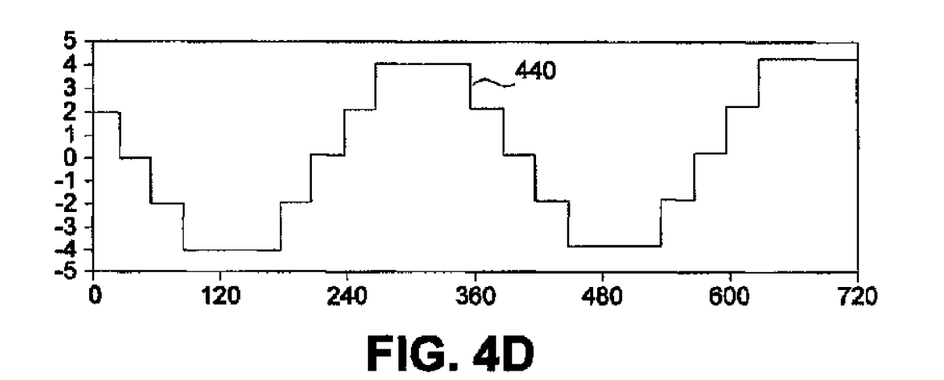
Figure 5A:
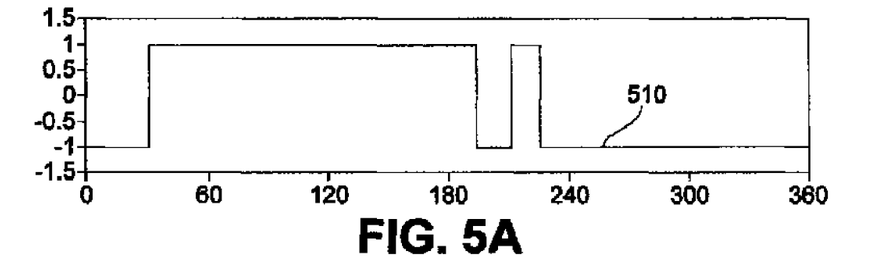
FIGS. 5A-5D illustrate example input waveforms and converter outputs according to example embodiments of the invention.
Figure 5B:
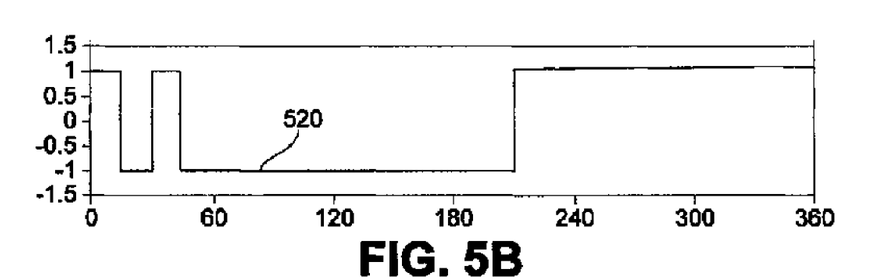
Figure 5C:
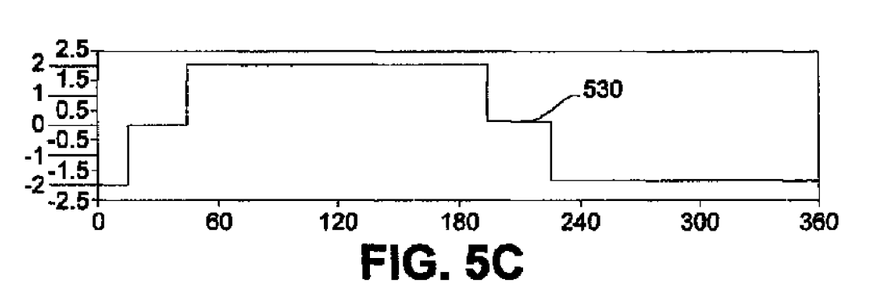
Figure 5D:
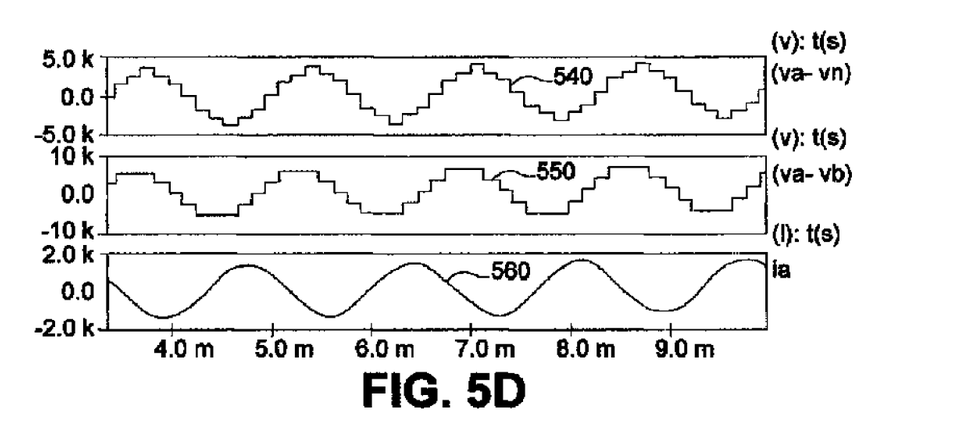
Figure 6A:
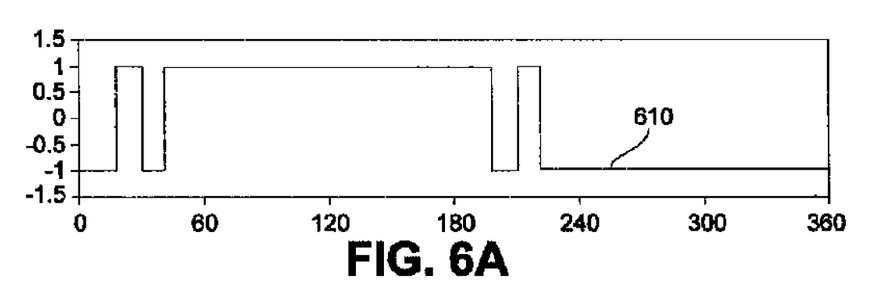
FIGS. 6A-6D illustrate example input waveforms and converter outputs according to example embodiments of the invention.
Figure 6B:
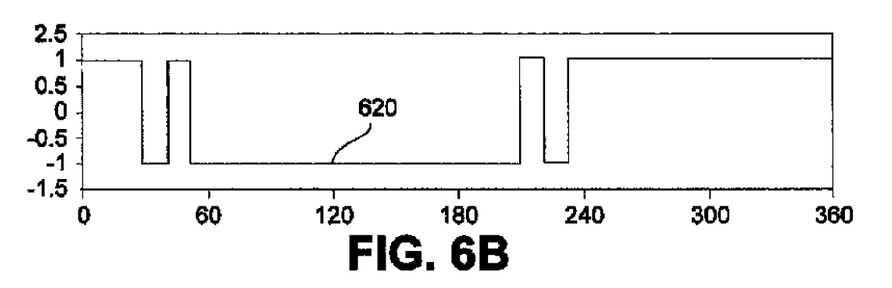
Figure 6C:
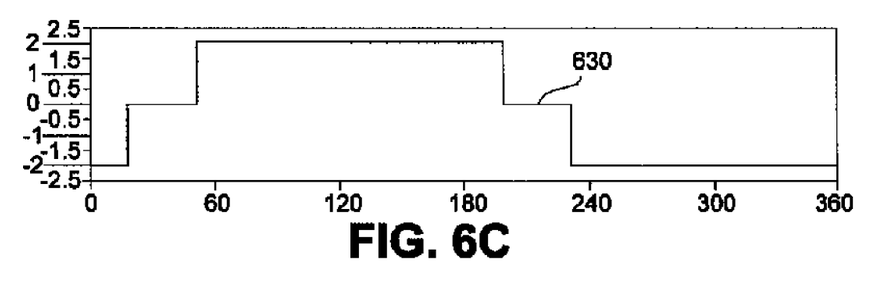
Figure 6D:
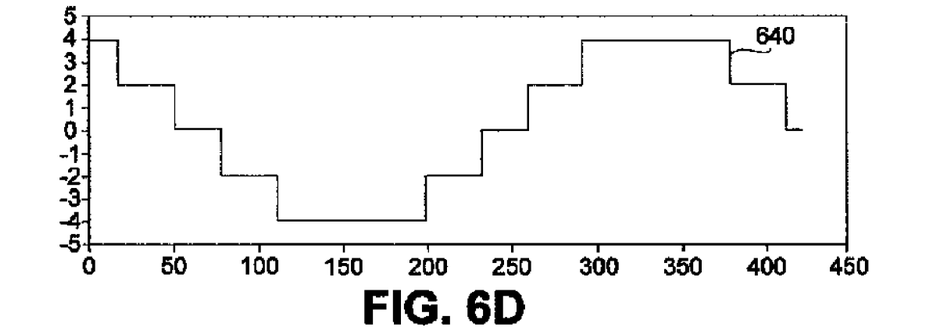
Figure 7A:
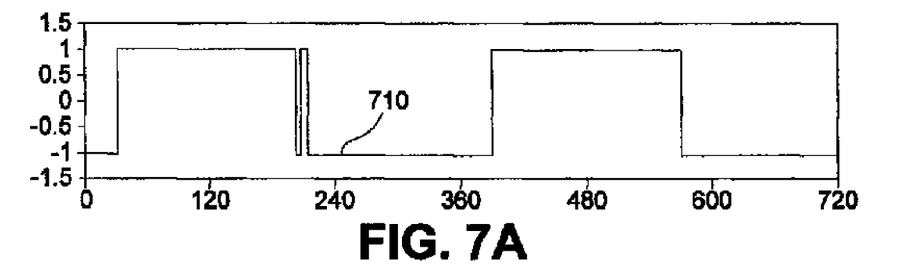
FIGS. 7A-7D illustrate example input waveforms and converter outputs according to example embodiments of the invention.
Figure 7B:
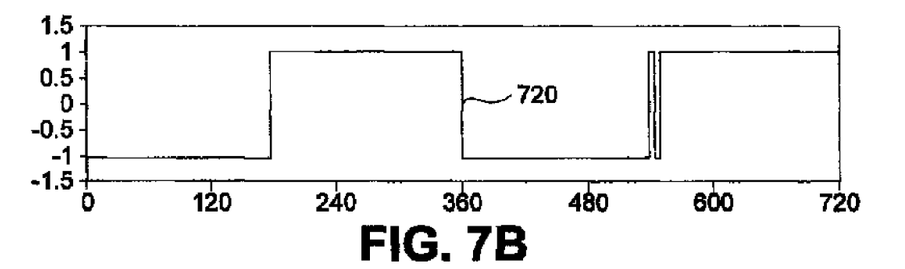
Figure 7C:
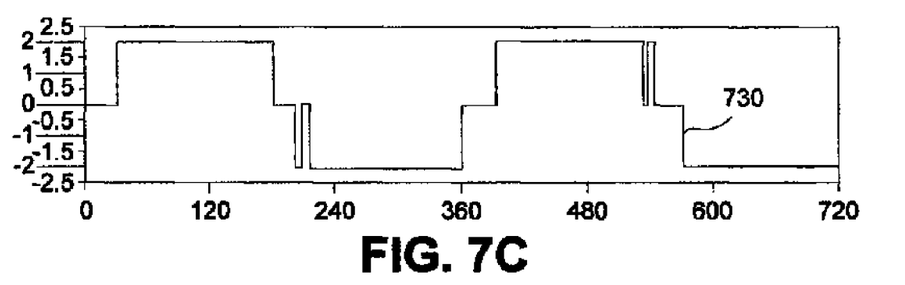
Figure 7D:
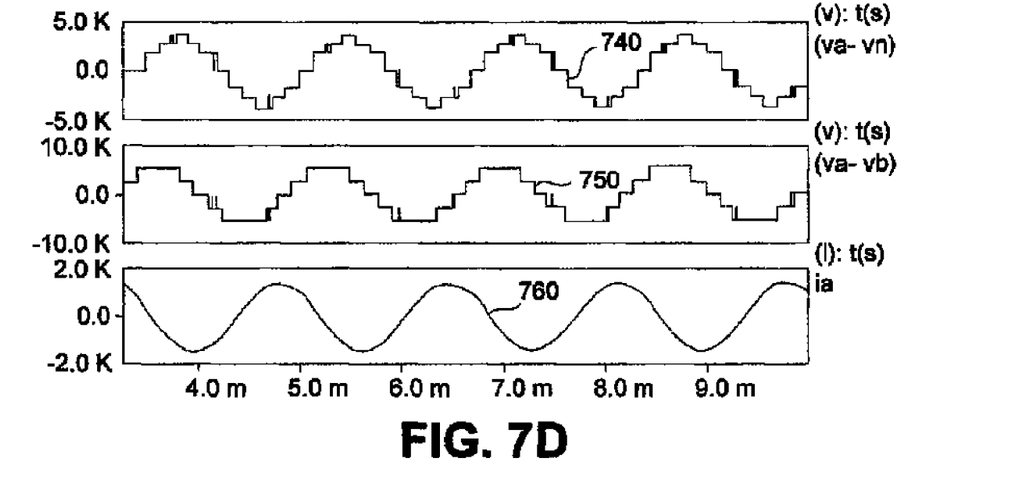

Further studies were conducted for PP1, PP2, PP3 and PP1.5 for evaluation of the effect of phase shift between the two legs of the bridges, notch width and notch location. With zero phase shift between control waveforms for legs of each individual H-bridge, some of the control waveforms to different H-bridges may not be unique resulting in some of the switching events in connected h-bridges occurring simultaneously, thereby not generating extra pulses on the output. In the aforementioned converter utilizing PP2 control waveforms, the control signals will be unique, but some of the switching events happen simultaneously and in the same direction in the same H-bridge. Switching loss occurs in both of the legs of the H-bridge simultaneously and in the same direction, without benefit of a switching event being seen in the output waveform. It is, therefore, desirable to introduce phase shift on the control signals between the two legs of the individual H-bridge to allow the switching edges to create voltage changes on the output waveform. Shifting phase between legs of the bridge may shift the timing of output step changes and preserve higher-level output, thereby more closely simulating sinusoidal output performance and limiting distortion. FIG. 4A (5A, 6A, 7A) illustrates a waveform 410 (510, 610, 710) for one phase of a single-phase H-bridge with a PP1 (PP2, PP3, PP1.5) input waveform. FIG. 4B (5B, 6B, 7B) illustrates a waveform 420 (520, 620, 720) for a second phase of a single-phase H-bridge with a PP1 (PP2, PP3, PP1.5) input waveform. FIG. 4C (5C, 6C, 7C) illustrates an output voltage waveform 430 (530, 630, 730) of a single H-bridge with a PP1 (PP2, PP3, PP1.5) input waveform. FIG. 4D (5D, 6D, 7D) illustrates a voltage output waveform 440 (540, 640, 740) (line-to-line) for a single phase H-bridge with a PP1 (PP2, PP3, PP1.5) input waveform. FIG. 5D (7D) illustrates simulation results for converter output voltage (line-to-line) 550 (770) and phase A line current 560 (760).

Combinations of phase shift in the control signal, notch width selection, and notch placement were modeled for the PP1, PP2, PP3, and PP1.5 control signals to determine optimum combinations for minimizing total harmonic distortion ("THD"). The PP1 input waveform incorporated a 30-degree phase shift between the bridges with no notch. The PP2 input waveform incorporated a 15-degree notch with no phase shift between bridges. The PP3 input waveform incorporated 10-degree notch with a 10-degree phase shift between bridges. The PP1.5 input waveform incorporated a 7-degree notch with a 30-degree phase shift between bridges. TABLE 1 summarizes the total harmonic distortion on load current for the input waveforms PP1, PP2, PP3, and PP1.5 as modeled. A minimum THD on load current is provided by the PP1.5 control waveform.

TABLE 1

| Pulse Pattern | Switching Frequency | Min. THD (load current) |
| --- | --- | --- |
| PP1 | Fundamental × 1 | 2.62% |
| PP2 | Fundamental × 2 | 2.62% |
| PP3 | Fundamental × 3 | 2.62% |
| PP1.5 | Fundamental × 1.5 | 2.49% |

During studies, using example converters applied to example loads, gating control signals comprising a gating control signal waveform having an effective frequency approximately 1.5 times the fundamental frequency, a notch width of approximately 7 degrees, and applying an approximately 30 degree phase shift resulted in the lowest total harmonic distortion. These example input and output signals are illustrated in FIGS. 7A-7D. However, it is appreciated that in other embodiments, other waveforms having differing notch widths, phase shifts, and/or effective frequencies may cause lower harmonic distortions and/or lower switching loss. The previously described input and output waveforms are exemplary, and other waveforms may be applied to converters in accordance with other embodiments of the invention.

Figure 8:
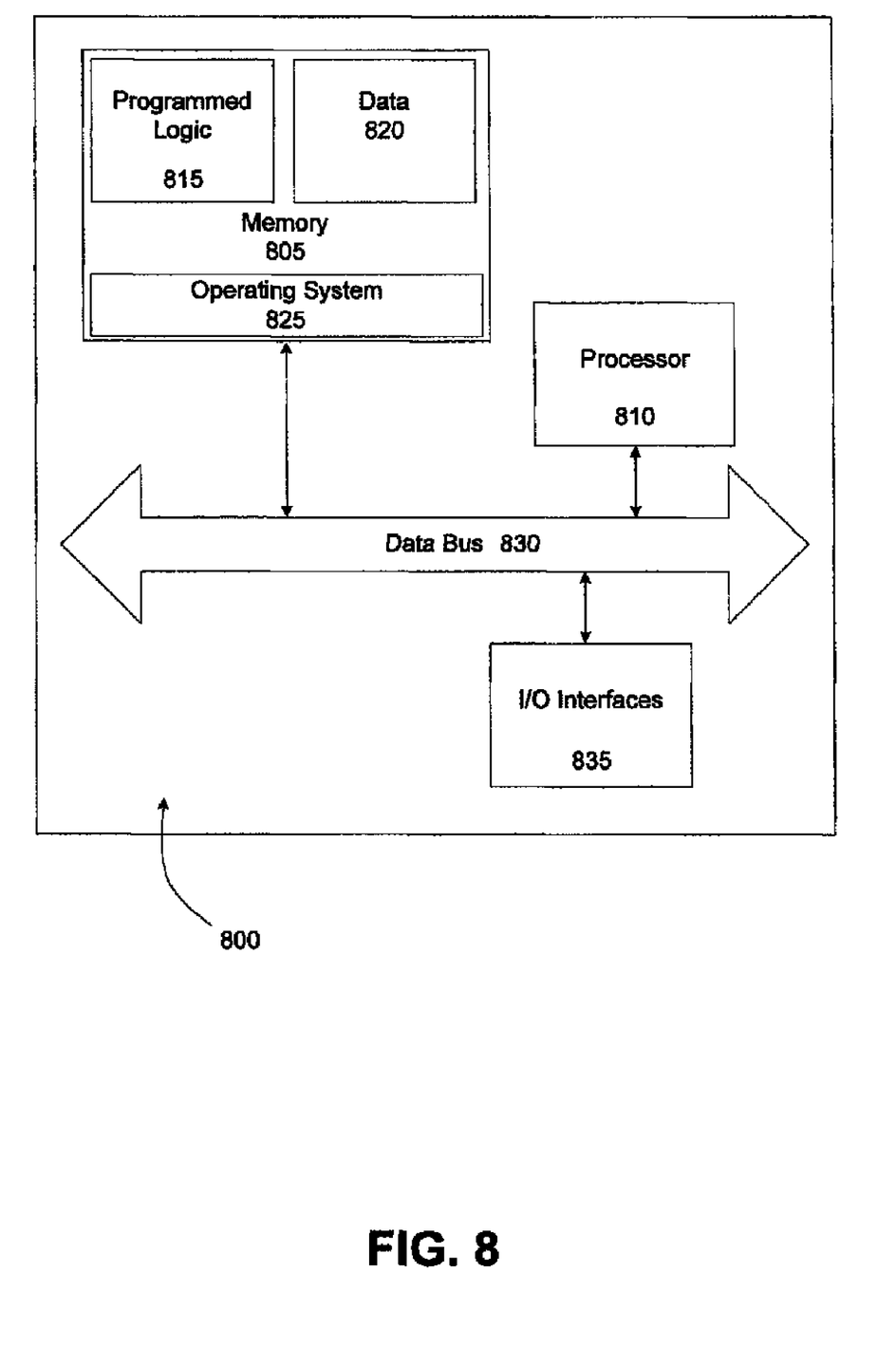
FIG. 8 illustrates a block diagram of an example control unit according to an example embodiment of the invention.

The gating control signals or switching signals, as described herein, may be controlled by a microprocessor, an integrated circuit, a field programmable gate array (also referred to as an "FPGA"), or other electronic circuitry as is known. FIGS. 8 depicts a block diagram of one example of a control unit 800 that may be utilized in accordance with various embodiments of the invention in order to generate or control the generation of gating control input signals to the switches of a converter, like the gating controller 175 illustrated in FIG. 1. As used herein, the terms "control unit," "gating controller," and "controller" may he utilized interchangeably. The control unit 800 may include a memory 805 that stores programmed logic 815 (for example, software) in accordance with the invention. The memory 805 may also include data 820 utilized in the operation of the invention and an operating system 825. A processor 810 may utilize the operating system 825 to execute the programmed logic 815, and in doing so, may also utilize the data 820. A data bus 830 may provide communication between the memory 805 and the processor 810. Users may interface with the control unit 800 via one or more user interface device(s) 835 such as a keyboard, mouse, control panel, or any other devices capable of communicating digital data to the control unit 800. The control unit 800 and the programmed logic 815 implemented thereby may comprise software, hardware, firmware or any combination thereof. Further, It will be appreciated that a suitable control unit may include more or less than all of the components illustrated in FIG. 2.

The control unit 800 may generate or control the generation of one or more input gating control signals that are supplied to the switches of a power converter, such as the converter 100 illustrated in FIG. 1. The one or more gating control signals may control the actuation of the switches, such as the switches 112 illustrated in FIG. 1. It will be appreciated that a respective gating control signal may be supplied to each switch; however, it is possible that a gating control signal may be supplied to multiple switches. Additionally, in some embodiments, a first gating control signal may be supplied to a first switch (or first set of switches) and second gating control signal may be altered or phase-shifted and the resultant signal may be applied to a second switch (or second set of switches). The resultant signal may then be altered or phase-shifted and applied to a third switch (or third set of switches) and so on. It will be appreciated that many different alterations, such as differing pulse patterns, adjusted notches, varied notch widths, or phase-shifts may be applied to the gating control signal or signals, as further described by example with respect to FIGS. 2-7.

For example, a first input signal may be supplied to a switch of the first phase 105 of the converter 100. The first input signal may be phase-shifted any desired amount, such as approximately 120 degrees, and supplied to a switch of the second phase 106 of the converter 100. The first input signal may additionally be phase-shifted by another amount, such as approximately 240 degrees, and supplied to a switch of the third phase 107 of the converter 100.

Figure 9:
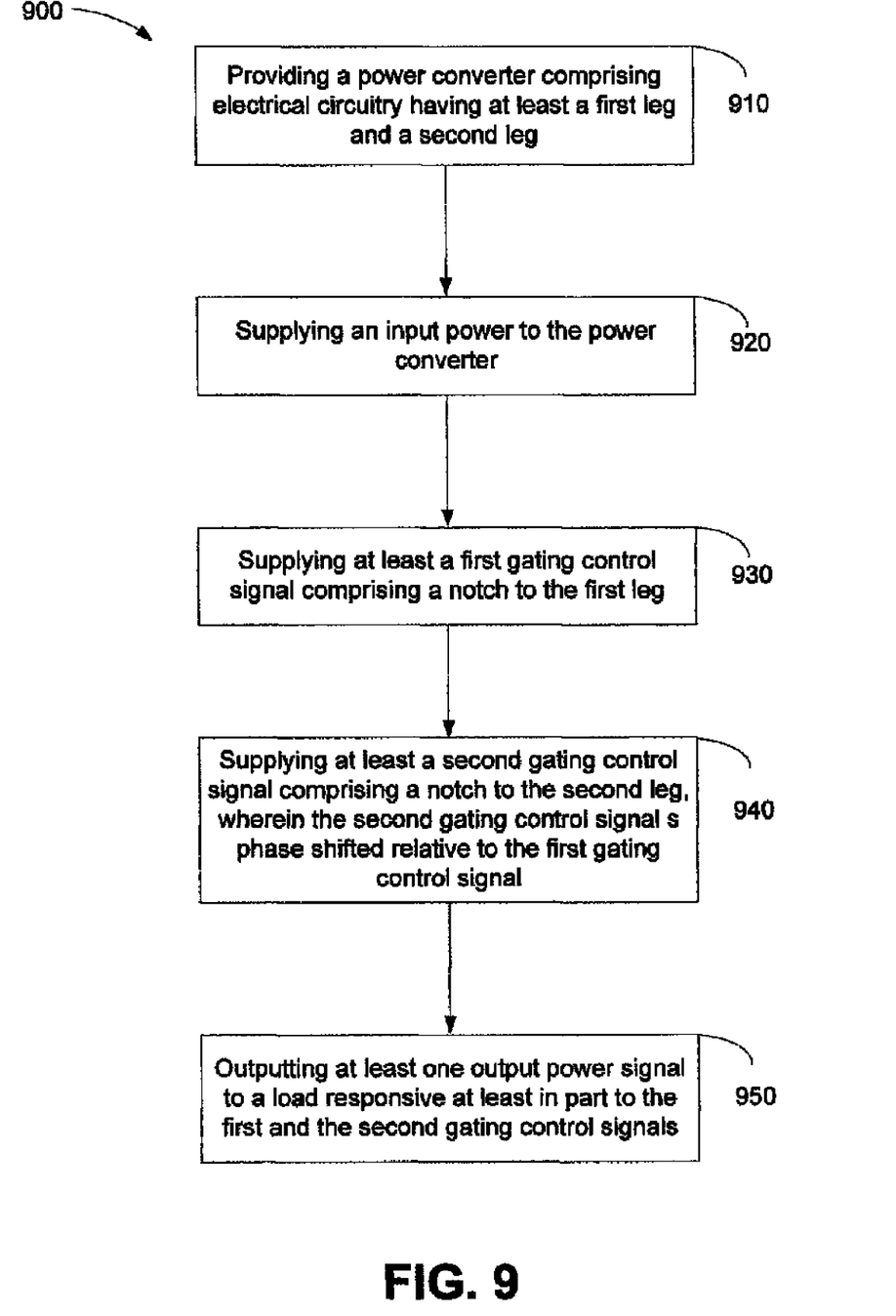
FIG. 9 illustrates an example method for controlling a converter according to an example embodiment of the invention.

FIG. 9 illustrates an example method by which an embodiment of the invention may operate. Provided is an example flowchart 900 illustrating methods for controlling a power converter, such as described in reference to FIG. 1, which may be used to power a load, such as a high speed electric motor. The power converter may be controlled by gating control signals, for example, those described in reference to FIGS. 2-7.

The example method may begin at block 910. At block 910, a power converter is supplied. The power converter may be include electrical circuitry as is described by example with reference to FIG. 1. In one example, the power converter may be a three-phase, wye-connected H-bridge converter. However, other converters, such as single-phase converters or delta converters, for example, may be supplied. The power converter may include at least a first leg and a second leg, such as the output leg 125 and the neutral leg 130 illustrated in FIG. 1.

Block 920 follows block 910, in which an input power signal is supplied to the converter. The input power signal may be a direct current signal. However, it will be appreciated that any appropriate input power signal may be provided to the converter in accordance with embodiments of the invention.

Block 930 follows block 920, in which at least a first gating control signal is supplied to the first leg of the converter. The gating control signals may be supplied by a gating controller, such as the gating controller 175 illustrated in FIG. 1. As is further described below, the gating controller may be used to generate and supply additional gating control signals. Alternatively, however, multiple gating controllers may be employed to supply some or all of any additional gating control signals. According to an aspect of the invention, the first gating control signal may include one or more notches. The one or more notches may facilitate the reduction of the total harmonic distortion in a load that is connected to the output of the converter, It is appreciated that additional gating control signals may optionally be supplied to the first leg of the converter.

Block 940 follows block 930, in which at least a second gating control signal is supplied to the second leg of the converter. The second gating control signal may include a notch, similar to that as described with reference to block 930.

Block 950 follows block 940, in which at least one output power signal is output to a load responsive at least in part to the first and the second gating control signals supplied.

Each control signal supplied may be a waveform taking any form, such as, for example those waveforms described with reference to FIGS. 2-7. More specifically, however, each gating control signal waveform may have an effective switching frequency, which is based upon the notches generated in the waveform, between approximately 1 to approximately 3 times the fundamental frequency of the waveform supplied. However, it is appreciated that these effective frequencies provided are exemplary, and waveforms having other effective frequencies may be generated in accordance with other embodiments of the invention.

Additionally, each gating control signal includes a notch generated in the waveform. Each notch may have a notch width between up to approximately 20 degrees, relative to a 360 degree period of the gating control signal. In one example embodiment, the notch width may be between approximately 20 degrees and approximately 5 degrees. In another example embodiment, the notch width may be approximately 7 degrees. Additionally, each gating control input signal may be phase shifted relative to the other gating control signal. For example, the second gating control signal may be phase shifted up to approximately 40 degrees with respect to the first gating control signal.

In one example embodiment, as described above with reference to FIG. 7, a first gating control signal may have an effective switching frequency of 1.5 times the fundamental frequency. This can be shown best by FIG. 7B, where a notch is generated at approximately 540 degrees—1.5 times 360 degrees. This example waveform may further include a notch having an approximately 7 degree notch width, which may also be shown by FIG. 7B at approximately 540 degrees, where the waveform switches from high to low to high within about 7 degrees. Finally, comparing the first waveform in FIG. 7A relative to the second waveform in FIG. 7B, an approximately 40 degree phase shift is observable.

Again, the gating control signal waveforms illustrated in FIGS. 2-7 are example waveforms, and other waveforms may be generated in accordance with embodiments of the invention. For example, to determine other gating control signal waveforms that may result in better reduction in total harmonic distortion or switching losses, one may observe the conditions responsive to various adjustments to the effective frequencies, notch widths, and/or phase shifts, and various combinations thereof.

References are made herein to block diagrams of systems, methods, apparatuses, and computer program products according to example embodiments of the invention. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational elements to be performed on the computer or other programmable apparatus to produce a computer implemented process such that the instructions that execute on the computer or other programmable apparatus provide elements for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the invention may be embodied in many forms and should not be limited to the example embodiments described above. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for powering a load, comprising:
providing a power converter comprising electrical circuitry comprising at least a first leg and a second leg;
supplying an input power signal to the power converter;
supplying at least a first gating control signal to the first leg;
supplying at least a second gating control signal to the second leg; and
outputting at least one output power signal to the load responsive at least in part to the first and the second gating control signals supplied;
wherein the first gating signal and the second gating signal each comprise a waveform comprising a notch; and
wherein the second gating control signal is phase shifted relative to the first gating control signal.

2. The method of claim 1, wherein each notch of the first and the second gating signals comprises a notch width between approximately 5 degrees to approximately 20 degrees.

3. The method of claim 1, wherein each notch of the first and the second gating signals comprises a notch width of approximately 7 degrees.

4. The method of claim 1, wherein the relative phase shift between the first and the second gating signals comprises between an approximately 5 degree to an approximately 40 degree phase shift.

5. The method of claim 1, wherein the relative phase shift between the first and the second gating signals comprises an approximately 30 degree phase shift.

6. The method of claim 1, wherein each of the first and the second gating control signals comprises an effective switching frequency between approximately 1 times to approximately 3 times the fundamental frequency of the power converter.

7. The method of claim 1, wherein each of the first and the second gating control signals comprises an effective switching frequency of approximately 1.5 times the fundamental frequency of the power converter.

8. The method of claim 1, wherein the load comprises at least one high speed electrical motor.

9. The method of claim 1, further comprising adjusting at least the notch width or the relative phase shift of at least one of the first gating control signal or the second gating control signal to improve at least one of switching loss or harmonic distortion of the output power signal.

10. A system for providing power to a load, comprising:
a voltage source operable to supply a power signal;
a power converter comprising electrical circuitry comprising at least a first leg and a second leg;
at least one gating controller operable to supply at least a first gating control signal to the first leg and at least a second gating control signal to the second leg of the power converter;
wherein the first gating signal and the second gating signal each comprise a waveform comprising a notch; and
wherein the first gating control signal is phase shifted relative to the second gating control signal; and
wherein the converter is operable to receive the power signal from the voltage source and output at least one output power signal to the load responsive at least in part to the first and the second gating control signals supplied.

11. The system of claim 10, wherein each notch of the first and the second gating signals comprises a notch width between approximately 5 degrees to approximately 20 degrees.

12. The system of claim 10, wherein each notch of the first and the second gating signals comprises a notch width of approximately 7 degrees.

13. The system of claim 10, wherein the relative phase shift between the first and the second gating signals comprises between an approximately 5 degree to an approximately 40 degree phase shift.

14. The system of claim 10, wherein the relative phase shift between the first and the second gating signals comprises an approximately 30 degree phase shift.

15. The system of claim 10, wherein each of the first and the second gating control signals comprises an effective switching frequency between approximately 1 times to approximately 3 times the fundamental frequency of the power converter.

16. The system of claim 10, wherein each of the first and the second gating control signals comprises an effective switching frequency of approximately 1.5 times the fundamental frequency of the power converter.

17. The system of claim 10, wherein the load comprises at least one high speed electrical motor.

18. The system of claim 10, further comprising adjusting at least the notch width or the relative phase shift of at least one of the first gating control signal or the second gating control signal to improve at least one of switching loss or harmonic distortion of the output power signal.

19. A method for powering a load, comprising:
providing a three-phase wye-connected H-bridge power converter, wherein each phase of the H-bridge power converter comprises two legs;
supplying an input power signal to the H-bridge power converter;
supplying a different gating control signal to each leg of each phase of the H-bridge power converter, wherein each gating control signal comprises a waveform comprising a notch, and wherein each gating control signal is phase shifted relative to the other respective gating control signal supplied to the other leg of the same phase; and
outputting at least one output power signal to the load responsive at least in part to the gating control signals supplied.

20. The method of claim 19, wherein each gating control signal comprises an effective switching frequency of approximately 1.5 times the fundamental frequency of the power converter, wherein the notch of each gating control signal comprises a notch width of approximately 7 degrees, and wherein the relative phase shift between each gating control signal supplied to the same phase comprises an approximately 30 degree phase shift.

* * * * *